United States Patent [19]

Maeda

[11] Patent Number: 4,799,205

[45] Date of Patent: Jan. 17, 1989

[54] APPARATUS FOR CAUSING A HEAD TO ACCESS A SELECTED ONE OF A PLURALITY OF TRACKS

[75] Inventor: Masaya Maeda, Kanagawa, Japan

[73] Assignee: Canon Kabushiki Kaisha, Tokyo, Japan

[21] Appl. No.: 58,600

[22] Filed: Jun. 2, 1987

Related U.S. Application Data

[63] Continuation of Ser. No. 906,650, Sep. 11, 1986, abandoned, which is a continuation of Ser. No. 554,839, Nov. 23, 1983, abandoned.

[30] Foreign Application Priority Data

Nov. 25, 1982 [JP] Japan ................. 57-206361

[51] Int. Cl.⁴ .............................................. G11B 21/10
[52] U.S. Cl. ......................................... 369/43; 369/32; 369/50; 360/69; 360/78.14; 360/72.1; 360/77.16
[58] Field of Search ................. 369/32, 43, 44, 45, 369/46, 47, 50, 53; 360/69, 78, 10.2, 72.1, 72.2, 77, 78; 358/342, 907

[56] References Cited

U.S. PATENT DOCUMENTS

| | | | |
|---|---|---|---|
| 3,997,876 | 12/1976 | Frush | 360/50 X |
| 4,016,603 | 4/1977 | Ottesen | 360/72.2 X |
| 4,103,314 | 6/1977 | Case | 360/78 |
| 4,136,365 | 1/1979 | Chick et al. | 318/634 X |
| 4,148,082 | 4/1979 | Okada et al. | 360/77 |
| 4,149,199 | 4/1979 | Chick et al. | 360/77 |
| 4,205,338 | 5/1980 | Schaefer | 360/77 X |
| 4,365,324 | 12/1982 | Michaelis | 369/44 |
| 4,419,701 | 12/1983 | Harrison et al. | 360/77 X |
| 4,445,153 | 4/1984 | Fujimoto | 360/77 |

Primary Examiner—Robert L. Richardson
Attorney, Agent, or Firm—Toren, McGeady & Associates

[57] ABSTRACT

A reproducing apparatus for reproducing a disc type signal bearing medium, which includes a reproducing transducer head and an automatic tracking control device for aligning the head with a selected track of the medium. The control device includes an electromechanical converting element for moving the head, a signal producing circuit for producing a tracking control signal based on the reproduced signal, a memory circuit for memorizing the control signal, and a switching circuit for selectively connecting the converting element with the signal producing circuit and the memory circuit. In a single track reproducing mode, the switching circuit connects the converting element with the signal producing circuit, and in a successive track reproducing mode, the switching circuit connects the converting element with the memory circuit.

39 Claims, 3 Drawing Sheets

APPARATUS FOR CAUSING A HEAD TO ACCESS A SELECTED ONE OF A PLURALITY OF TRACKS

This is a continuation of application Ser. No. 906,650, filed Sept. 11, 1986, which is a continuation of Ser. No. 554,839, filed Nov. 23, 1983 both now abandoned.

BACKGROUND OF THE INVENTION

1. Field of the Invention

This invention relates to a reproducing apparatus and more particularly to an apparatus for controlling the position of a transducer relative to recording tracks on a recording medium, i.e. for tracking control over the transducer.

2. Description of the Prior Art

Recording tracks which are formed, for example, concentrically on a recording medium, such as a magnetic disc, have some positional error deviating about several ten $\mu$m from a reference position due to the error of a stepwise feeding action performed on a recording head during a recording. Therefore, where record reproduction is carried out with a reproducing apparatus that differs from the apparatus used for recording the record or where the recording medium has been deformed by changes in temperature, etc., it is difficult to accurately carry out tracking control solely by means of the stepwise feeding mechanism including a suitable driving source, such as a stepping motor. To overcome this difficulty, there has been proposed an arrangement in which automatic tracking control is accomplished with a transducer, such as a magnetic head, carried by an electric-to-mechanical converting element. This element is driven with a control signal based on a reproduction output. However, in moving a reproducing head at a high speed for continuous reproducing, etc., the tracking control arrangement of the prior art has presented a problem with respect to the responsibility of the electric-to-mechanical converting element. Another shortcoming of the prior art arrangement is that the controlling direction of the tracking control is hardly discernible when the control is accomplished by a dither method.

It is a principal object of the present invention to provide a reproducing apparatus which is capable of eliminating the above shortcomings of the prior art and particularly those of the tracking control arrangement hitherto employed.

It is another object of the invention to provide a tracking control arrangement which is compatible between different apparatuses and is provided with means for permitting adequate control even in an operation mode in which a transducer must continuously gain access to a plurality of recording tracks, one after another, on a recording medium, as during a continuous reproducing mode or during a search mode.

It is a further object of the invention to provide means for carrying out appropriate control even in an operation mode wherein the transducer, by the above arrangement, gains access to the above-plurality of recording tracks, one after another.

SUMMARY OF THE INVENTION

A reproducing apparatus for reproducing recorded signals from a signal bearing medium having a plurality of tracks, each recorded with a signal in which the apparatus includes transducer means for reproducing a signal from a selected track of the signal bearing medium, moving means for relatively moving the transducer means and the bearing medium so as to position the transducer means and the signal bearing medium so as to position the transducer means relative to the selected track of the medium, and adjusting means for adjusting the position of the transducer means relative to the selected track. The apparatus also includes control signal producing means for producing, on the basis of a reproduced signal obtained through the transducer means, a control signal for controlling the adjusting means to align the transducer means with the selected track. Also included are memory means for memorizing the control signal produced from the control signal producing means and signal providing means for providing the adjusting means with the control signal memorized in the memory means.

To achieve the second object, a preferred embodiment representing an aspect of the invention includes a moving mechanism which moves a transducer relative to recording tracks on a recording medium, tracking control means which controls tracking of the transducer according to a signal reproduced by the transducer, and memory means which memorizes information on the transducer tracking control.

To achieve the third object, a preferred embodiment representing an aspect of the invention includes a shifting mechanism which shifts a transducer relative to recording tracks on a recording medium; tracking control means which controls tracking of the transducer according to a signal reproduced by the transducer; memory means which memorizes information on the transducer tracking control; and adjusting means for adjusting the position of the transducer depending on the control information memorized in the memory means in an operation mode in which the transducer is allowed to gain access to a plurality of recording tracks, one after another, recorded on the recording medium.

In the foregoing description, the term "transducer" means a signal transducer, such as a magnetic head, an optical head, an electrostatic capacity type head or the like that reproduces signals recorded on the recording medium. The term "recording medium" as used, for the purpose of this invention, is any of the recording medium usable for the above signal transducer means.

These and further objects and features of the invention will become apparent from the following detailed description of a preferred embodiment thereof taken in conjunction with the accompanying drawings.

DETAILED DESCRIPTION OF THE PREFERRED EMBODIMENT

Figure 1:
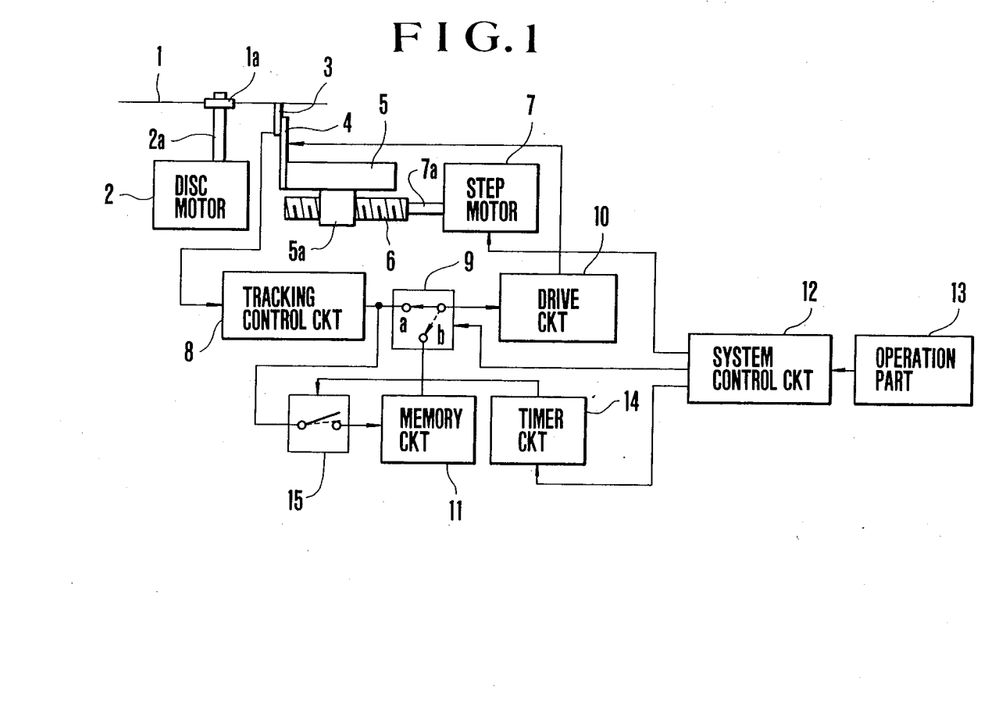
FIG. 1 is a block diagram showing a reproducing apparatus and particularly the arrangement of the tracking control part thereof as a preferred embodiment of the present invention.

Referring to FIG. 1, which shows a reproducing apparatus as an embodiment of the present invention, the apparatus includes a magnetic disc 1 as a recording medium which has a center core 1a at the center thereof; a disc motor 2 which drives the magnetic disc 1 and which has a rotating spindle 2a having the center core 1a of the disc magnetic 1 attached thereto; a magnetic head 3 as a transducer; and an electric-to-mechanical converter element 4 which is composed of, for example, a piezoelectric bi-morph element. The electric-to-mechanical converter element 4 carries the magnetic head 3 at its fore end and is deflectable to displace the head 3 relative to the magnetic disc 1 in the radial direction thereof, that is in a direction crossing the recording tracks. The electric-to-mechanical converter element 4 is attached to a head carriage 5 at its tail end. The head carriage 5 is provided with an engaging part 5a which has a female screw part. This female screw part of the engaging part 5a is engaged with a screw 6, which is provided on a shaft 7a of a step motor 7. In addition, the head carriage 5 also engages with a guide member, which is not shown, at a suitable part thereof. The head carriage 5 is thus movable in the radial directions of the magnetic disc 1, i.e. a direction crossing the recording tracks as the shaft 7a of the step motor 7 rotates. The electric-to-mechanical converter element 4, which acts as an actuator on the magnetic head 3, may be replaced with a moving coil. Meanwhile, the step motor 7, which serves as stepwise feeding means, may be replaced with some other moving mechanism consisting of a drive source, such as a plunger or the like, and a cam mechanism driven by the drive source.

The apparatus further includes a tracking control circuit 8 which detects a signal reproduced by the magnetic head 3 and produces a correction signal for correcting the track deviation of the head 3 relative to a selected track. The details of the tracking control circuit 8 will be described later herein with reference to FIG. 2. A drive circuit 10 drives the electric-to-mechanical converter element 4. The drive circuit 10 is connected via a terminal "a" of a switch circuit 9 to the output terminal of the tracking control circuit 8 and via another terminal "b" of the switch circuit 9 to the output terminal of a memory circuit 11. The memory circuit 11 is connected to the output terminal of the tracking control circuit 8 via a switch circuit 15. A system control circuit 12 controls the step motor 7, the switch circuit 9 and a timer circuit 14, which will be described later herein. The system control circuit 12 is in combination with an operation part 13. The timer circuit 14 controls the switch circuit 15 by the output thereof.

The following description of the operation of the apparatus described above deals mainly with the features of the present invention: The feeding screw 6 has the lead thereof such that an integral multiple of the number of rotating steps of the step motor 7 corresponds to the amount of shift of the magnetic head 3 on the magnetic disc 1 in the radial direction of the magnetic disc 1 to an extent corresponding to one track pitch. However, for the sake of simplification, let us assume that the one rotating step of the step motor 7 corresponds to a head feeding extent corresponding to one track pitch. The reproduction output of the magnetic head 3 is supplied to the tracking control circuit 8. The tracking control circuit 8 then produces a correction signal for correcting the track deviation of the magnetic head 3 relative to a selected track. The correction signal is fed back via the drive circuit 10 to the electric-to-mechanical converter element 4 to effect the tracking control over the magnetic head 3.

Meanwhile, recording tracks, which are concentrically formed on the magnetic disc 1, are deviating from their reference positions approximately ten $\mu$m due to a feeding error of a recording head or the like, which was made at the time. Therefore, where the record of these tracks is to be reproduced by a reproducing apparatus other than an apparatus used for recording or where the magnetic disc 1 is expansively or contractively deformed by changes in temperature, etc., it is hardly possible to accurately accomplish tracking control by merely operating the stepwise feeding mechanism of the step motor 7. Therefore, as has been mentioned in the foregoing, there has been proposed an automatic tracking control means. However, in the event that the magnetic head 3 is to be moved quickly by allowing the step motor 7 to rotate at a high speed, as in the case of continuous reproduction, continuous reproduction of different still pictures or motion picture reproduction, the electric-to-mechanical converter element 4 presents a problem in responsiveness. Besides, when using the automatic tracking control in accordance with a dither method, the controlling direction of the magnetic head 3 is hardly discernible when the magnetic head 3 is dither controlled while straddling two tracks.

In the embodiment shown in FIG. 1, therefore, the correction signal produced from the automatic tracking control circuit 8 is memorized at the memory circuit 11 when one track is reproduced for a time greater than a predetermined period. Then, positioning control over the magnetic head 3 is performed based on the memorized correction signal until another track is reproduced for a time greater than the predetermined period.

More specifically, in a single track reproducing mode, when the operator designates a desired track number at the operation part 13, the step motor 7 rotates either forward or backward. Thereby the head carriage 5 operates until the magnetic head 3 reaches the designated track and the apparatus operates in the single track reproducing mode. In the single track reproducing mode, the timer circuit 14 operates under the control of the system control circuit 12. After the lapse of a predetermined time period, say, one second or thereabout, required for completion of an automatic tracking control operation, the timer circuit 14 produces an output. The output of the timer circuit 14 cancels the switch circuit 15, closing for a predetermined time period. Then, a correction signal produced at that time from the tracking control circuit 8 is memorized in the memory circuit 11.

Next, when the operator sets the apparatus in a mode for allowing the magnetic head 3 to gain access to a plurality of tracks one after another, such as in a continuous reproduction mode or a search mode, the system control circuit 12 causes the switch circuit 9 to connect the terminal "b" thereof. This holds the magnetic head 3 under the control of the correction signal memorized in the memory circuit 11 via the drive circuit 10, and the magnetic head 3 is moved to the tracks by the step motor 7. Then, when the operator again sets the apparatus back to the single track reproducing mode, the switch circuit 9 connects the terminal "a" and automatic tracking control is performed according to the reproduction output of the magnetic head 3. Then, after the lapse of the above predetermined time period, a new correction signal is memorized in the memory circuit 11.

Figure 2:
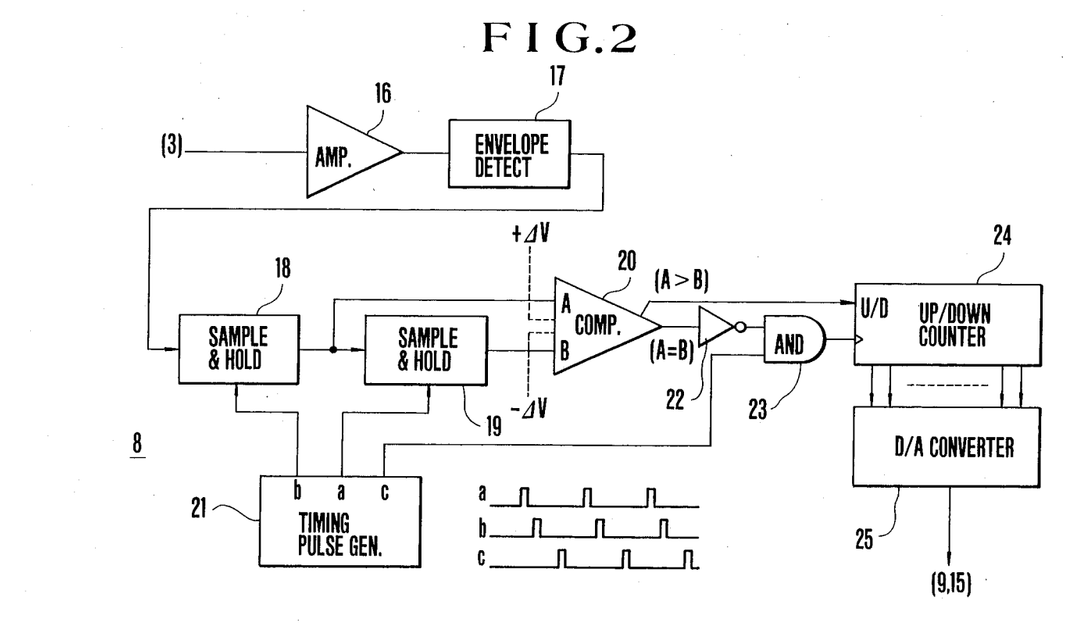
FIG. 2 is a circuit diagram showing the details of the tracking control circuit shown in FIG. 1.

An example of an arrangement of the above tracking control circuit 8 is as shown in FIG. 2. Referring to FIG. 2, the reproduction output of the magnetic head 3 shown in FIG. 1 is amplified at a reproduction amplifier 16. After that, the amplified reproduction output is supplied to an envelope detection circuit 17 having the envelope thereof detected there. In this specific example, the signal recorded on the magnetic disc 1 is a frequency modulated signal such as a video signal. The output of the envelope detection circuit 17 is sampled and held by a first sample-and-hold circuit 18 in accordance with the timing of timing pulses "b" from a timing pulse generation circuit 21 as shown in the drawing. The output is further sampled and held by a second sample-and-hold circuit 19 according to the timing of timing pulses "a" produced from the timing pulse generation circuit 21. The outputs of the first and second sample-and-hold circuits 18,19 are applied to a comparison circuit 20 for size comparison. Assuming that the input from the first sample-and-hold circuit 18 is A and the input from the second sample-and-hold circuit 19 is B, the output level "A>B" of the comparison circuit 20 becomes high when A is larger than B and the level of another output "A=B" of the circuit 20 becomes high when the two inputs are equal. In the actual arrangement, the comparison circuit 20 includes, for example, a differential amplifier which obtains "A−B"; two voltage comparators which compare respectively the output "A−B" of the differential amplifier with small reference voltages $+\Delta V$ and $-\Delta V$, which are as shown in broken lines in FIG. 2; an NOR logic gate which receives the outputs of the two comparators; etc. The comparison circuit 20 makes the output level "A>B" high when $A-B>+\Delta V$ and the output level "A=B" high when $-\Delta V<A-B<+\Delta V$.

The output "A=B" of the comparison circuit 20 is inverted by an inverter 22 and is then applied to one of the input terminals of an AND gate 23. Meanwhile, timing pulses "c" produced from the timing pulse generation circuit 21 are applied to the other input terminal of the AND gate 23. The AND gate 23 allows the timing pulses "c" to pass therethrough only when the output level of the inverter 22 is high, that is, only when the level of the output "A=B" of the comparison circuit 20 is low. The timing pulses "c" thus produced from the AND gate 23 are supplied to the clock input terminal of an up-down counter 24 (hereinafter called U/D counter) which then counts the pulses "c". Meanwhile, the output "A>B" of the comparison circuit 20 is applied as a count mode control signal to the mode input terminal of the U/D counter 24. The U/D counter 24 assumes an up count mode when the level of the output "A>B" is high and a down count mode when the level of the output "A>B" is low. The digital output of the U/D counter 24 is supplied to a digital-to-analog converter 25 (hereinafter called D/A converter). The D/A converter 25 converts the digital output into a corresponding analog voltage. The analog voltage output thus produced from the D/A converter 25 is supplied to the switch circuits 9 and 15, which are shown in FIG. 1.

Assuming that one field portion or one frame portion of a video signal according to the NTSC system is recorded on one circular track of the magnetic disc 1, the magnetic disc 1 must be rotated at 3,600 rpm or 1,800 rpm during reproduction. As for the timing pulse generation circuit 21, the timing pulses "a", "b" and "c" are all produced at 60 Hz or 30 Hz at, as shown in FIG. 2, during reproduction. In other words, the timing pulses "b" are produced slightly later than the timing pulses "a" and the timing pulses "c" slightly later than the timing pulses "b". With such an arrangement, the first sample-and-hold circuit 18 always samples and holds the output of the envelope detection circuit 17 produced for the same point on each of the recording tracks of the magnetic disc 1. The second sample-and-hold circuit 18 samples and holds a value held by the first circuit 18 immediately before renewal thereof. As a result, the high level of the output "A>B" of the comparison circuit 20, which compares the outputs A and B of the first and second sample-and-hold circuits 18 and 19, indicates that the magnetic head 3 is moved adjust its position to the recording track of the magnetic disc 1. The high level of the output "A=B" indicates that the head 3 is on-track, i.e. adjusted. If both the levels of the outputs "A>B" and the "A=B" are low, it indicates that the magnetic head 3 is being displaced, moving away from the recording track. Accordingly, the U/D counter 24 counts upward as long as the output "A>B" remains at a high level, counts downward as long as both the levels of the outputs "A>B" and "A=B" remain low and stops counting when the level of the output "A=B" becomes high. With the U/D counter 24 controlled in this manner, the U/D counter 24 gives digital data required for controlling the electric-to-mechanical converter element 4 for adjusting the magnetic head 3 to the recording track. The output of the U/D counter 24 is converted into the corresponding analog voltage at the D/A converter 25. The analog voltage thus obtained is supplied to a subsequent circuit, shown in FIG. 1 as the tracking correction control signal.

The drive circuit 10, which is shown in FIG. 1 is, drives and deflects the electric-to-mechanical converter element 4 to an extent corresponding to the value of the analog voltage produced from the above-D/A converter 25. The arrangement of this circuit is well known as, for example, a bi-morph element driving circuit and thus requires no further description herein. The memory circuit 11 memorizes the analog voltage output of the D/A converter 25 supplied thereto via the switch circuit 15. In this specific embodiment, the memory circuit 11 is formed as an analog voltage memory circuit including a capacitor, etc. in a well known manner.

Figure 3:
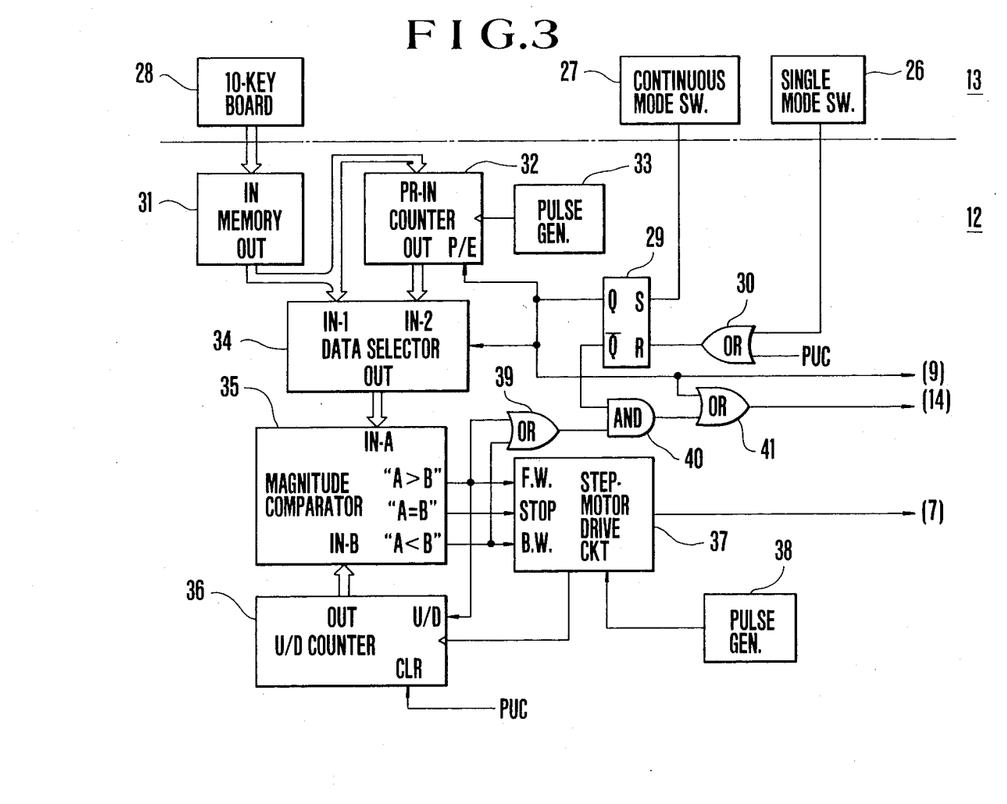
FIG. 3 is a circuit diagram of a system control circuit and an operation part included in FIG. 1.

FIG. 3 shows the details of the arrangement of the above system control circuit 12 and the operation part 13.

The operation part 13 includes a switch 26 for setting the single track reproducing mode; a switch 27 for setting the continuous reproducing mode; and a ten-key board 28 for setting an address of a desired track to be reproduced in the single track reproducing mode and an address of a desired starting track with which reproduction is to be started in the continuous reproducing mode.

The system control circuit 12 includes an RS flip-flop 29 which memorizes the setting mode of the apparatus and is set in response to the operation of the reproducing mode switch 27. The RS flip-flop 29 is reset by a power-up-clear signal PUC and also by the operation signal of the single track reproducing mode switch 26 supplied via an OR gate 30. Accordingly, the high level of the output Q of the RS flip-flop 29 or the low level of the output $\bar{Q}$ thereof indicates the continuous reproducing mode while the high level of the output $\bar{Q}$ or the low level of the output Q indicates the single track reproducing mode. The output Q of the RS flip-flop 29 is supplied to the switch circuit 9 of FIG. 1. In this specific embodiment, the switch circuit 9 is connected to the side of a terminal "a" in response to the low level of the output Q of the RS flip-flop 29 representing the single track reproducing mode and to the terminal "b" in response to the high level of the output Q representing the continuous reproducing mode. The switch circuit 9 is operated in this manner by known electronic means.

The datum on the track designated by the ten-key board 28 is memorized by a memory circuit 31 which is composed of a register, etc. The output of the memory circuit 31 is supplied to the preset input terminal (PR-IN) of a presettable counter 32 and also to the first input terminal (IN-1) of a data selector 34. With the apparatus set in the continuous reproducing mode, a datum produced from the memory circuit 31 at that time is preset in the presettable counter 32 in response to the high level of the output Q of the RS flip-flop 29. Then the counter 32 counts track change pulses produced from a pulse generation circuit 33. The output of the counter 32 is supplied to the second input terminal (IN-2) of the data selector 34. The data selector 34 receives the output Q of the RS flip-flop 29 as a control signal. When the output Q is at a low level, i.e. in the single track reproducing mode, the data selector 34 selects the output datum of the memory circuit 31 received at the first input terminal IN-1. When the level of the output Q is high, i.e. in the continuous reproducing mode, the data selector 34 selects the output datum of the counter 32 received at the second input terminal IN-2. The output of the data selector 34 is supplied to the A input terminal (IN-A) of a digital magnitude comparator 35. Meanwhile, the output of an up-down counter 36 (hereinafter called the U/D counter) which memorizes an address of a track confronting the magnetic head 3 is supplied to the B input terminal (IN-B) of the comparator 35. The comparator 35 determines which of the two inputs A and B is larger or smaller and, as a result, makes the level of one of its outputs "A>B", "A=B" and "A<B" high. These three outputs of the comparator 35 are supplied to a step step motor drive circuit 37. The motor drive circuit 37 drives the step motor 7, shown in FIG. 1 on the basis of the three outputs and the motor driving pulses produced from a pulse generation circuit 38. More specifically, when the level of the output "A>B" of the comparator 35 is high, for example, the drive circuit 37 causes the motor 7 to rotate forward to move the magnetic head 3 in the predetermined direction (for example, toward the center of the disc 1). When the level of the output "A<B" is high, the drive circuit 37 rotates the motor 7 backward moving the magnetic head 3 in the reverse direction (for example, toward the periphery of the disc 1). If the level of the output "A=B" is high, the drive circuit 37 cuts off the supply of the driving pulses stopping the motor 7. Furthermore, the high level of the output "A>B" of the comparator 35 sets the counting mode of the U/D counter 36 to an up-count mode while the low level of the output "A>B" sets it to a down-count mode. The U/D counter 36 counts the driving pulses applied from the step motor drive circuit 37 to the step motor 7 and is cleared by the power-up clear signal PUC.

The outputs "A>B" and "A<B" of the comparator 35 are supplied to an OR gate 39. Therefore, when the address of the track confronting the magnetic head 3 does not coincide with the track address represented by the datum produced from the data selector 34, i.e. the designated track, the output level of the OR gate 39 becomes high. The output of the OR gate 39 is supplied to an AND gate 40 together with the output $\bar{Q}$ of the RS flip-flop 29. Therefore, the output level of the AND gate 40 becomes high when the address of the track confronting the magnetic head 3 does not coincide with the designated track. The output of the AND gate 40 is supplied to an OR gate 41 together with the output Q of the RS flip-flop 29. The output of the OR gate 41 is then supplied to the timer circuit 14 of FIG. 1 as a reset signal. The timer circuit 14 is thus reset by the high level output of the OR gate 41 and counts only when the output level of the OR gate 41 is low.

In the above embodiment, the operation in the single track reproducing mode is as follows: The address of a desired reproducing track is set into the memory circuit 31 via the ten-key board 28. Then, when the single track reproducing mode switch 26 is operated, the RS flip-flop 29 is reset. The output level Q of the RS flip-flop 29 becomes low and the output $\bar{Q}$ becomes high. The low level of the output Q connects the switch circuit 9 to the terminal "a". The output of the tracking control circuit 8 is thus supplied to the drive circuit 10. The data selector 34 selects the output of the memory circuit 31. Then, the motor drive circuit 37 operates the motor 7 bringing the magnetic head 3 to the track indicated by the output of the data selector 34 according to the output of the comparator 35. In this instance, the output level of either "A>B" or "A<B" of the comparator 35 is high until the magnetic head 3 reaches the designated track. Therefore, the output level of the AND gate 40 becomes high. The output level of the OR gate 41 also becomes high. Then, the timer circuit 14 of FIG. 1 is kept at reset. Then, when the magnetic head 3 reaches the designated track, the output level "A=B" of the comparator 35 becomes high. As a result, the step motor drive circuit 37 stops the step motor 7. The magnetic head 3 stops at that position. The tracking control circuit 8 then performs tracking control over the magnetic head 3 for the designated track under this condition. Meanwhile, with the low output level of the OR gate 39 becoming low in this instance, the output level of the AND gate 40 becomes low. The output level of the OR gate 41 also becomes low. Therefore, the timer circuit 14 begins to perform a time count. Then, after the lapse of the predetermined period of time, the timer circuit 14 produces a signal the level of which remains high for a predetermined period of time. During this period, the switch circuit 15 remains on allowing a correction signal produced from the tracking control circuit 8 to be memorized in the memory circuit 11. If another track is designated by the ten-key board 28 before the lapse of the count time of the timer circuit 14, the output level of the AND gate 40 again becomes high resetting the timer circuit 14. Therefore, in that instance, the memory circuit 11 does not memorize the correction signal there.

To operate the timer circuit 14 in the above manner, the timer circuit 14 may consist of a C-R (capacitor-resistor) time constant circuit, a threshold comparator, a one-shot circuit (monostable multivibrator) when produces a signal the level of which becomes high and remains high for a predetermined time period, in response to the output of the comparator, etc.

In the continuous reproducing mode, or in the search mode, information on the address of a track with which the continuous reproduction is desired to commence is put into the memory circuit 31 via the ten-key board 28. The continuous reproducing mode switch 27 is operated, thereby setting the RS flip-flop 29. The level of the output Q of the flip-flop 29 becomes high and that of the output $\bar{Q}$ low. The high level of the output Q connects the switch circuit 9 to the terminal "b" supplying the output of the memory circuit 11 to the drive circuit 10. The output datum of the memory circuit 31 is preset into the counter 32. The data selector 34 selects the output of the counter 32. Furthermore, in this instance, the timer circuit 14 of FIG. 1 is kept reset with the output of the OR gate 41 at a high level.

Then, the magnetic head 3 is moved by the driving action of the motor 7 caused by the motor drive circuit 37 depending on the output of the comparator 35 in the same manner as previously described. However, in the continuous reproducing mode, track changing pulses produced from the pulse generation circuit 33 cause the counter 32 to count up and, accordingly, the moving action on the head 3 comes to be continuously performed. Furthermore, in this instance, the track change pulses from the pulse generation circuit 33 preferably have their period selectable according to the operation mode selected, such as the continuous reproducing mode, the motion picture reproducing mode, the search mode, etc.

In the continuous reproducing mode, since the switch circuit 9 is connected to the terminal "b" as mentioned above, the output of the memory circuit 11 is supplied to the drive circuit 10. Therefore, the positioning action of the magnetic head 3 for each track is fixedly accomplished on the basis of the correction signal which is obtained by the tracking control circuit 8 in the single track reproducing mode.

In accordance with the invention, as has been described in detail, the arrangement of memory means, which memorizes information on the tracking control over the transducer, permits interchangeability among different apparatus through a relatively simple arrangement. The arrangement also permits appropriate control even in an operation mode in which the transducer must be allowed to successively gain access to a plurality of recording tracks, such as in a continuous reproducing operation or a searching operation. Furthermore, the apparatus according to the invention is capable of very stable control even in the above operation mode, allowing the transducer to successively gain access to a plurality of recording tracks.

In the specific embodiment given above, the recording medium is a magnetic disc 1. However, the magnetic disc may be replaced with an optical disc 1, an electrostatic capacity type disc or the like or may be replaced even with a drum type recording medium. Furthermore, the invention is also applicable to an apparatus using a tape-shaped recording medium such as a VTR (video tape recorder), particularly advantageous for carrying out reproduction of a still picture, an intermittent picture, frame feeding reproduction, etc.

What I claim is:

1. In a reproducing apparatus for reproducing recorded signals from a signal bearing medium, said medium having a plurality of tracks, each being recorded with a signal, wherein said apparatus includes selecting means for selecting any one of the plurality of tracks for reproduction, and
   (A) transducer means for reproducing a signal from selected one of the tracks of said signal bearing medium;
   (B) moving means for relatively moving said transducer means and said bearing medium so as to position the transducer means relative to said selected one of the tracks of the medium;
   (C) adjusting means for adjusting the position of said transducer means relative to said selected track;
   (D) control signal producing means for producing, on the basis of a reproduced signal obtained through said transducer means, a control signal for controlling said adjusting means so as to align the transducer means with said selected track;
   wherein the improvement comprises
   (E) memory means for memorizing said control signal produced from said control signal producing means; and
   (F) signal providing means for providing said adjusting means with the control signal memorized in said memory means.

2. The apparatus according to claim 1, further comprising:
   memory control means for causing said memory means to memorize said control signal when a predetermined period of time has passed after said transducer means has been positioned relative to said selected track by said moving means.

3. The apparatus according to claim 1, wherein said signal providing means is arranged to selectively provide said adjusting means with the non-memorized control signal provided by said control signal producing means and the memorized control signal provided by said memory means.

4. The apparatus according to claim 3, further comprising:
   mode changing means for changing a signal reproduction mode of the apparatus between a first mode in which said transducer means is given access to only one track of the medium and a second mode in which the transducer means is given access to each of a plurality of successive tracks of the medium in sequence; and
   positioning, control means for controlling said moving means, said positioning control means being responsive to said mode changing means and causing the moving means to position said transducer means relative to selected one track in said first mode while causing the moving means to sequentially position the transducer means relative to each of a plurality of successive tracks,
   wherein said signal providing means is responsive to said mode changing means and provides said adjusting means with said non-memorized control signal in said first mode while providing the adjusting means with the memorized control signal in said second mode.

5. The apparatus according to claim 4, further comprising:
   memory control means for controlling said memory means, said memory control means being responsive to said mode changing means and in said first mode, causing the memory means to memorize said control signal when a predetermined period of time has passed after said transducer means has been positioned relative to said selected track.

6. The apparatus according to claim 1, wherein said signal providing means is arranged to selectively provide said adjusting means with the control signal memorized in said memory means.

7. The apparatus according to claim 6, further comprising:
   mode setting means for setting a signal reproduction mode of the apparatus to a sequentially reproducing mode in which said transducing means is given access to each of a plurality of successive tracks of the bearing medium in sequence; and control means for controlling said moving means, said control means being responsive to said mode setting means and causing the moving means to sequentially position said transducer means relative to each of a plurality of successive tracks when the reproduction mode is set to said sequential mode, wherein said signal providing means is responsive to said mode setting means and provides said adjusting means with the control signal memorized in said memory means when the reproduction mode is set to said sequential mode.

8. In a reproducing apparatus for reproducing recorded signals from a rotary type signal bearing medium, said medium having a plurality of tracks, each being recorded with a signal, wherein said apparatus includes selecting means for selecting any one of the plurality of tracks for reproduction, and (A) transducer means for reproducing a signal from selected one of the tracks of said signal bearing medium;

(B) moving means for moving said transducer means relative to said signal bearing medium so as to position the transducer means relative to said selected track;

(C) rotating means for rotating said signal bearing medium relative to said transducer means;

(D) adjusting means for adjusting the position of said transducer means relative to said selected track;

(E) control signal producing means for producing, on the basis of a reproduced signal obtained through said transducer means, a control signal for controlling said adjusting means so as to align transducer means with said selected track;

wherein the improvement comprises (F) memory means for memorizing said control signal produced from said control signal producing means; and (G) signal providing means for providing said adjusting means with the control signal memorized in said memory means.

9. The apparatus according to claim 8, further comprising:

memory control means for causing said memory means to memorize said control signal when a predetermined period of time has passed after said transducer means has been positioned relative to said selected track by said moving means.

10. The apparatus according to claim 8, wherein said signal providing means is arranged to selectively provide said adjusting means with the non-memorized control signal provided by said control signal producing means and the memorized control signal provided by said memory means.

11. The apparatus according to claim 10, further comprising:

mode changing means for changing a signal reproduction mode of the apparatus between a first mode in which said transducer means is given access to only one track of the medium and a second mode in which the transducer means is given access to each of a plurality of successive tracks of the medium in sequence; and positioning, control means for controlling said moving means, said positioning control means being responsive to said mode changing means and causing the moving means to position said transducer means relative to selected one track in said first mode while causing the moving means to sequentially position the transducer means relative to each of a plurality of successive tracks, wherein said signal providing means is responsive to said mode changing means and provides said adjusting means with said non-memorized control signal in said first mode while providing the adjusting means with the memorized control signal in said second mode.

12. The apparatus according to claim 11, further comprising:

memory control means for controlling said memory means, said memory control means being responsive to said mode changing means and in said first mode, causing the memory means to memorize said control signal when a predetermined period of time has passed after said transducer means has been positioned relative to said selected track.

13. The apparatus according to claim 8, wherein said signal providing means is arranged to selectively provide said adjusting means with the control signal memorized in said memory means.

14. The apparatus according to claim 13, further comprising:

mode setting means for setting a signal reproduction mode of the apparatus to a sequentially reproducing mode in which said transducing means is given access to each of a plurality of successive tracks of the bearing medium in sequence; and control means for controlling said moving means, said control means being responsive to said mode setting means and causing the moving means to sequentially position said transducer means relative to each of a plurality of successive tracks when the reproduction mode is set to said sequential mode, wherein said signal providing means is responsive to said mode setting means and provides said adjusting means with the control signal memorized in said memory means when the reproduction mode is set to said sequential mode.

15. The apparatus according to claim 8, wherein said adjusting means includes:

an electro-mechanical converting element for moving said transducer means in directions crossing the tracks of the medium; and a control circuit for controlling said converting element in response to the control signal provided by said signal providing means.

16. The apparatus according to claim 1, wherein said adjusting means includes:

an electro-mechanical converting element for moving said transducer means in directions crossing the tracks of the medium; and a control circuit for controlling said converting element in response to the control signal provided by said signal providing means.

17. An access device for multi-tracks comprising:

(A) indicating means for selecting one of a plurality of tracks on a recording medium;

(B) first access means for accessing a head to the track selected by said indicating means;

(C) second access means for accessing the head so as to compensate deviation between the head accessed by the first access means and the selected track; and (D) memory means for memorizing information of the compensation by the second access means.

18. An access device according to claim 17, further comprising control means for controlling the second access means on the basis of outputs of the memory means.

19. An access device according to claim 18, wherein the control means has a first control mode for accessing the head to the track selected by the indication means through the first and second access means, and a second mode for accessing the head to the track selected by the indicating means only by the accessing operation of the first access means without performing the compensating operation by the second access means on the basis of the outputs of the memory means.

20. An access device according to claim 17, wherein the second access means has detection means for detecting reproduction outputs from the head accessed by the first access means and servo means for making the head to follow the head in correspondence to outputs of the detection means.

21. An apparatus for causing a head to access a selected one of a plurality of tracks, comprising:
   (a) means for generating a shift indicating signal to shift a track accessed by said head, said generating means including means for generating said shift signal when a continuous reproducing mode is set;
   (b) first access means for shifting a track accessed by said head in response to said shift indicating signal; and
   (c) second access means for shifting said head so as to compensate deviation between any track accessed by the head by the first access means and a track to be accessed.

22. An apparatus according to claim 21, further comprising:
   (e) memory means for memorizing information of the compensation by said second access means.

23. An apparatus according to claim 22, further comprising control means for controlling the second access means on the basis of outputs of the memory means.

24. An apparatus according to claim 23, wherein the control means has a first control mode for accessing the head to the track to be accessed through the first and second access means, and a second mode for accessing the head to the track to be accessed only by the accessing operation of the first access means without performing the compensating operation by the second access means on the basis of the outputs of the memory means.

25. A reproducing apparatus comprising:
   (a) a reproducing head;
   (b) means for moving said reproducing head on a medium;
   (c) means for generating a shift signal to cause said moving means to shift an access track of said head;
   (d) means for adjusting said reproducing head on the basis of a reproduction output of said reproducing head; and
   (e) means for controlling said adjusting means, said controlling means prohibiting the operation of said adjusting means until a predetermined period lapses from when said moving means moves the access track of the reproducing head in response to said shift signal.

26. An apparatus according to claim 25, further comprising:
   (f) memory means for memorizing information of the adjustment by said adjusting means.

27. An apparatus according to claim 25, wherein said generating means includes:
   (a) means for setting a continuous reproducing mode; and
   (b) means for generating said shift signal when said continuous reproducing mode is set by said setting means.

28. An apparatus according to claim 25, wherein said adjusting means adjusts said reproducing head so as to maximize said reproduction output.

29. An apparatus according to claim 25, wherein said controlling means operates said adjusting means after said predetermined time.

30. A reproducing apparatus comprising:
   (a) means for transducing a signal from a medium;
   (b) first means for shifting a position of the medium to be transduced by said transducing means for a predetermined pitch;
   (c) second means for accessing said transducing means on a basis of a signal transduced by said transducing means;
   (d) generating means for generating an operating signal to cause said first means to operate; and
   (e) prohibiting means for prohibiting the operation of said second means until a predetermined time lapse from when said transducing head is moved with said predetermined pitch after a generation of said operating signal.

31. A reproducing apparatus according to claim 30, wherein said second means makes said transducing means access so as to maximize said reproduction output.

32. A reproducing apparatus according to claim 30, wherein said prohibiting means permits said second means to operate if a next operating signal is not generated until after the predetermined time lapses from the generation of said operating signal.

33. A reproducing apparatus according to claim 30, wherein said prohibiting means includes:
   (1) time forming means for forming said predetermined time after the generation of said operating signal; and
   (2) prohibiting means for prohibiting the operation of said second means in accordance with the state of said time forming means.

34. An apparatus for causing a head to access a selected one of a plurality of tracks, comprising:
   (a) means for generating a shift indicating signal to shift a track accessed by said head;
   (b) first access means for shifting a track accessed by said head in response to said shift indicating signal;
   (c) second access means for shifting said head so as to compensate deviation between any track accessed by said head with said first access means and a track to be accessed;
   (d) interval means for generating said shift indicating signal at said generating means with a given time interval; and
   (e) control means for controlling said second access means, said control means prohibiting an operation of said second access means during a period of time when said shift indicating signal is generated by said interval means.

35. An apparatus according to claim 34, wherein said generating means includes:
   (a) an operation part for generating said shift indicating signal.

36. An apparatus according to claim 34, wherein said first access means includes:
   (A) a carriage for moving said head; and
   (B) moving means for moving said carriage toward said track.

37. An apparatus according to claim 34, wherein said second access means includes:
(a) detection means for detecting a reproducing level of said head; and
(b) control means for controlling said reproducing so that the reproducing level detected by said detection means becomes a maximum level.

38. An apparatus according to claim 34, wherein said second access means further includes:
(C) a mechanism for shifting a reproducing position of said head.

39. An apparatus according to claim 21, further comprising control means for making said second access means disabled in said continuous reproducing mode.

* * * * *